US008331934B1

(12) United States Patent
Khalil et al.

(10) Patent No.: US 8,331,934 B1
(45) Date of Patent: Dec. 11, 2012

(54) METHOD AND SYSTEM FOR HARD HANDOFF IN HRPD

(75) Inventors: Mohamed Khalil, Murphy, TX (US); Haseeb Akhtar, Garland, TX (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/450,499

(22) Filed: Jun. 9, 2006

Related U.S. Application Data

(60) Provisional application No. 60/688,967, filed on Jun. 9, 2005.

(51) Int. Cl.
*H04W 36/00* (2009.01)

(52) U.S. Cl. .................. 455/436; 455/435.1; 455/435.2; 455/466; 455/453; 455/452; 370/331; 370/335; 370/356; 370/338

(58) Field of Classification Search .................. 455/436, 455/435.2, 435.1, 432.1, 466, 453, 452; 370/331, 370/355, 356, 338
See application file for complete search history.

(56) References Cited

U.S. PATENT DOCUMENTS

| | | | |
|---|---|---|---|
| 6,580,699 B1 * | 6/2003 | Manning et al. | 370/331 |
| 6,834,050 B1 * | 12/2004 | Madour et al. | 370/392 |
| 6,876,640 B1 * | 4/2005 | Bertrand et al. | 370/331 |
| 6,922,561 B2 * | 7/2005 | Chen et al. | 455/435.1 |
| 6,950,657 B1 * | 9/2005 | Hiller et al. | 455/445 |
| 6,956,846 B2 * | 10/2005 | Lewis et al. | 370/352 |
| 6,985,464 B2 * | 1/2006 | Harper et al. | 370/331 |
| 6,999,449 B2 * | 2/2006 | Barna et al. | 370/352 |
| 7,154,868 B1 * | 12/2006 | Sharma et al. | 370/331 |
| 7,170,871 B2 * | 1/2007 | Eyuboglu et al. | 370/331 |
| 7,193,985 B1 * | 3/2007 | Lewis et al. | 370/338 |
| 7,209,741 B2 * | 4/2007 | Julka et al. | 455/435.1 |
| 7,333,454 B2 * | 2/2008 | Yang et al. | 370/331 |
| 7,346,684 B2 * | 3/2008 | Borella | 709/225 |
| 2002/0021681 A1 * | 2/2002 | Madour | 370/331 |
| 2002/0045450 A1 * | 4/2002 | Shimizu et al. | 455/442 |
| 2002/0046277 A1 * | 4/2002 | Barna et al. | 709/224 |
| 2002/0114293 A1 * | 8/2002 | Madour et al. | 370/329 |
| 2002/0196749 A1 * | 12/2002 | Eyuboglu et al. | 370/328 |
| 2003/0021252 A1 * | 1/2003 | Harper et al. | 370/338 |
| 2003/0119519 A1 * | 6/2003 | Madour et al. | 455/453 |
| 2003/0171117 A1 * | 9/2003 | Wang et al. | 455/436 |
| 2005/0286470 A1 * | 12/2005 | Asthana et al. | 370/331 |
| 2006/0072506 A1 * | 4/2006 | Sayeedi et al. | 370/331 |
| 2006/0104228 A1 * | 5/2006 | Zhou et al. | 370/328 |
| 2006/0183472 A1 * | 8/2006 | Nookala et al. | 455/426.1 |

OTHER PUBLICATIONS

3rd Generation Partnership Project 2 "3GPP2," "Interoperability Specification (IOS) for High Rate Packet Data (HRPD) Access Network Interfaces," Revision A (Post SDO Ballot, Pre-SDO Publication Version), May 2003, 214 pages.

* cited by examiner

*Primary Examiner* — Kwasi Karikari
(74) *Attorney, Agent, or Firm* — Robert D. McCutcheon

(57) ABSTRACT

Various embodiments are described to assist in reducing handoff delays and the blackout period(s) associated with inter AN (access network) hard handoffs. The hard handoff procedure of method disclosed herein establishes or initiates a connection (A10-type connection) between a target AN and a packet data serving node (PDSN), unlike known hard handoff approaches that wait until traffic channel assignment to establish or initiate such connection. The PDSN may optionally bicast data packets to both the source and target ANs since each is communicatively coupled to the PDSN during a given time period. In the event bicasting is unavailable or unused, a communication tunnel between the source and target ANs may be created and used to transmit data packets between them.

15 Claims, 3 Drawing Sheets

METHOD AND SYSTEM FOR HARD HANDOFF IN HRPD

CROSS-REFERENCE TO RELATED APPLICATION

This application claims priority under 35 USC 119(e) to U.S. provisional Application Ser. No. 60/688,967, filed on Jun. 9, 2005, and which is incorporated herein by reference.

TECHNICAL FIELD

The present invention relates generally to wireless communication systems, and more particularly to a method and system for access terminal (AT) hard handoffs in a wireless communication system.

BACKGROUND

Current wireless broadband data communications systems provide high bandwidth necessary for delivering high data rates (and high quality voice, such as VOIP) for both fixed and mobile applications. During a communication session, an access terminal (AT) or station subscriber (either fixed or mobile) may require or desire a connection to a different access network (AN) (sometimes referred to as a resource network (RN) or wireless access point) during a given session. This may occur as a result of the AT moving into a different coverage area or the current session having insufficient bandwidth for the application, or for some other reason. In accordance with some communications protocols, the procedure of terminating and establishing a new connection includes a hard handoff procedure. In a hard handoff, the communication path or session between the AT and the other endpoint is usually terminated or placed in a dormant state before the new path or session is established.

Existing High Rate Packet Data (HRPD) systems function in accordance with interface standards developed by 3GPP2/TIA (3rd Generation Partnership Project 2/Telecommunications Industry Association, namely the HRPD Interoperablility Specification (IOS) (3GPP2 A.S0007-A v.2.0 May 2003), which is incorporated herein by reference. HRPD systems typically employ air interfaces in accordance with TIA-856, while their network architectures are structured according to either the TIA-878 or the TIA-1878 specifications, also incorporated herein by reference. At present, the HRPD and associated specifications do not provide for active packet data session hard handoffs between access networks (AN) in HRPD networks.

Instead, the specifications require the packet data session to be transitioned to the dormant state (basically terminated) before hand off (dormant mode handoff) to a target AN, as described in United States Patent Application Publication No. 2006/0072506 to Sayeedi, et al., which is incorporated herein by reference. The connection between the AT and the source AN is broken resulting in the packet data session becoming dormant. This is done prior to establishing a connection with the target AN. Once a connection is established between the AT and the target AN, the session is re-activated.

The U.S. Patent Application Pub. No. 2006/0072506 states that the approach disclosed therein enables an AT with an active packet data session to perform a hard handoff from a source AN to a target AN without having to force the data session dormant. In an effort to reduce delays in hard handoff, additional A13 messaging (with data session information) between source and target ANs or PCFs is used.

FIG. 1 is a diagram (of representative call or message flows) that depicts an access terminal (AT) with an active packet data session handing off from a source AN to a target AN, in accordance with prior art signaling techniques. Not all flows may be shown. It will be understood that hard handoff procedures within different communications systems or in accordance with similar but different protocols may have different specific call or message flows than that shown. It will also be understood that the occurrence of the source AN/PCF and PDSN A9/A11 messaging flow (for releasing the A10 and/or A8 connections between the source AN/PCF and PDSN), shown in FIG. 1 as occurring after the Traffic-ChannelAssignment, may occur at other times in the flow, such as described in U.S. Patent Application Pub. No. 2006/0072506.

Referring back to FIG. 1, a blackout period occurs during which data flow between the AT and the source AN is interrupted or terminated. This blackout period is shown in FIG. 1 and generally includes the time period between connection close or termination of the source AN-AT connection and/or source AN/PCF-PDSN connection (which usually occurs around the time of the traffic channel assignment) and establishment of the A10 connection between the target PCF and the PDSN (thereafter establishing an active session between the AT and target AN). As will be appreciated, a hard handoff may occur with or without A13 flows.

During the blackout period, no PCF-to-PDSN connection (RP connection) exists between the PDSN and the target PCF/AN (associated the target AN) and no AT-to-source AN connection exists. Though U.S. Patent Application Pub. No. 2006/0072506 states it is directed to reducing hard handoff delays, it does not appear to address such blackout period.

The blackout period may be on the order of 0.4 to 1 seconds, due to various actions necessary, such as reverse channel acquisition, source/target signaling, traffic channel generation and RP connection establishment. Once the DO or other connection (between the AT and target AN) and the RP connection (between the target PCF/AN and PDSN) are established, the packet data traffic once again flows between the AT and PDSN through the target AN.

During the blackout time period, data packets transmitted from other terminals (directed to the given AT) may still be received at the PDSN. Thus, the blackout period relates to connectivity, not necessarily data flow for the session. Delays in hard handoff and data blackouts may be unacceptable to applications with stringent QoS (quality of service) requirements, such as Voice over Internet Protocol (VoIP), Push to Talk (PTT), Video Telephony (VT) or other delay-sensitive applications. With no RP connection, these data packets are usually dropped. Though resends are possible in some applications, this loss of data is especially troubling in VoIP or other delay-sensitive applications.

Accordingly, there are needed methods and systems that reduce or minimize data loss during a hard handoff in wireless communications systems.

SUMMARY

In accordance with one embodiment, there is provided a method for facilitating handoff of an access terminal (AT) between a source access network (AN) and a target AN in a wireless communications network. The method includes receiving a message from the AT operable for initiating handoff of the AT. Prior to traffic channel assignment, establishment of a communications path between the target AN and a packet data node for carrying user data packets is initiated.

In accordance with another embodiment of the present invention, there is provided a computer program embodied on a computer readable medium and operable to be executed by a processor within a communications device or system, the computer program comprising computer readable program code for performing the method described above. In yet another embodiment, there is provided a source access network having means for performing the steps described above.

In another embodiment, there is provided, in a wireless communications system having a source access network (AN) and a target AN, a method for facilitating handoff of an access terminal (AT) between the source AN and the target AN. A message is received at the source AN from the AT, the message operable for initiating handoff of the AT. Prior to traffic control assignment, an A11 Registration Request is sent from the target AN to a packet data serving node (PDSN). A communications path between the PDSN and the target AN is established which is operable for carrying user data packet. This method may include bicasting user data packets to the target AN and the source AN when the bicasting information indicates bicasting, otherwise, unicasting the user data packets to a one of the target AN and the source AN. This method may also include wherein when the user data packets are unicast, generating a tunnel between the source AN and the target AN and transmitting the user data packets from one to the other. In yet another embodiment, there is provided an access terminal for a wireless communications network, wherein the access terminal is operable to transmit a signal resulting in establishment of a communications path between a target AN and a packet data node prior to assignment of a traffic channel between the target AN and access terminal.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
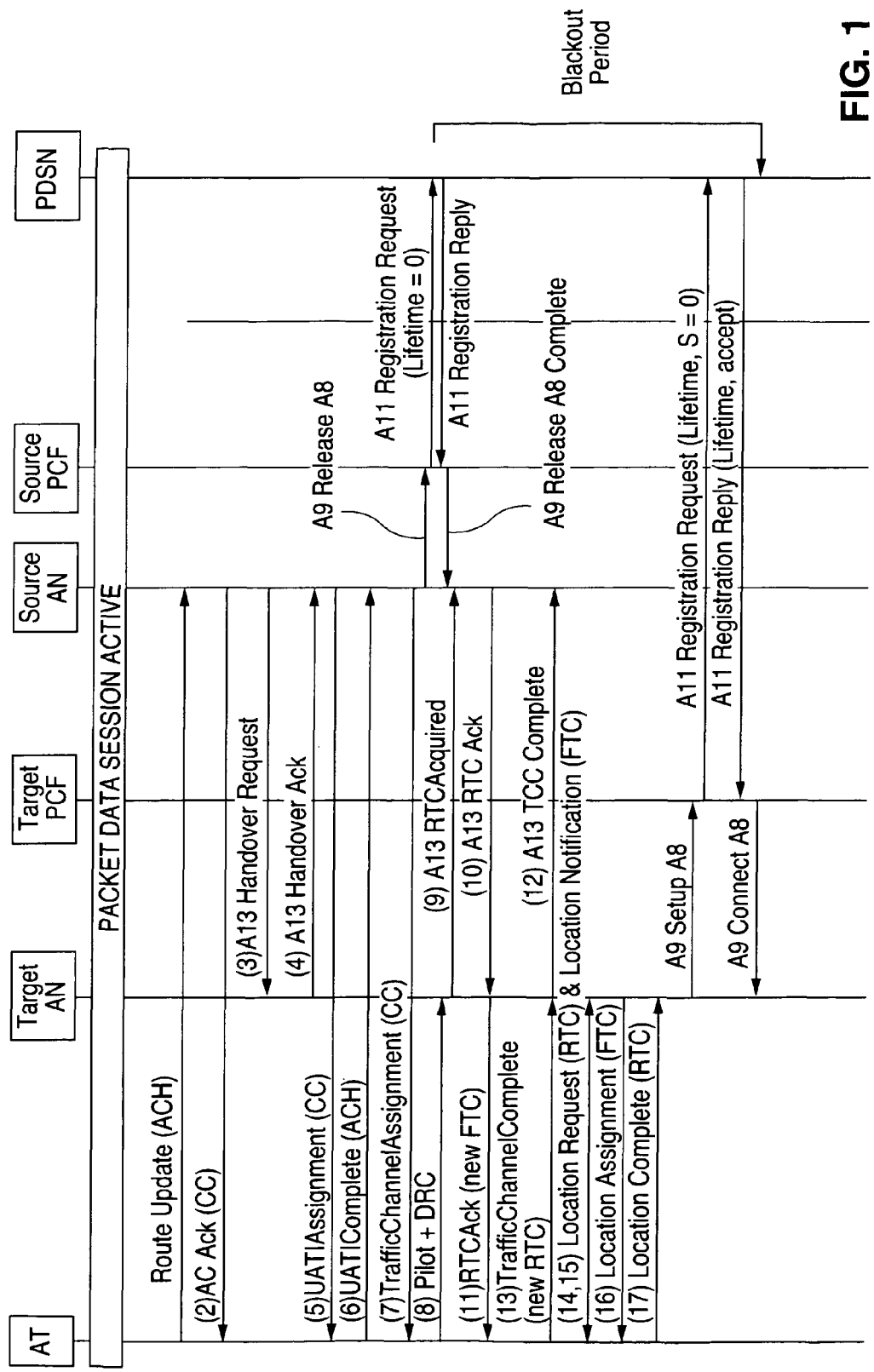
FIG. 1 illustrates call or message flow of a conventional prior art hard handoff procedure in a wireless communications network.
Figure 2:
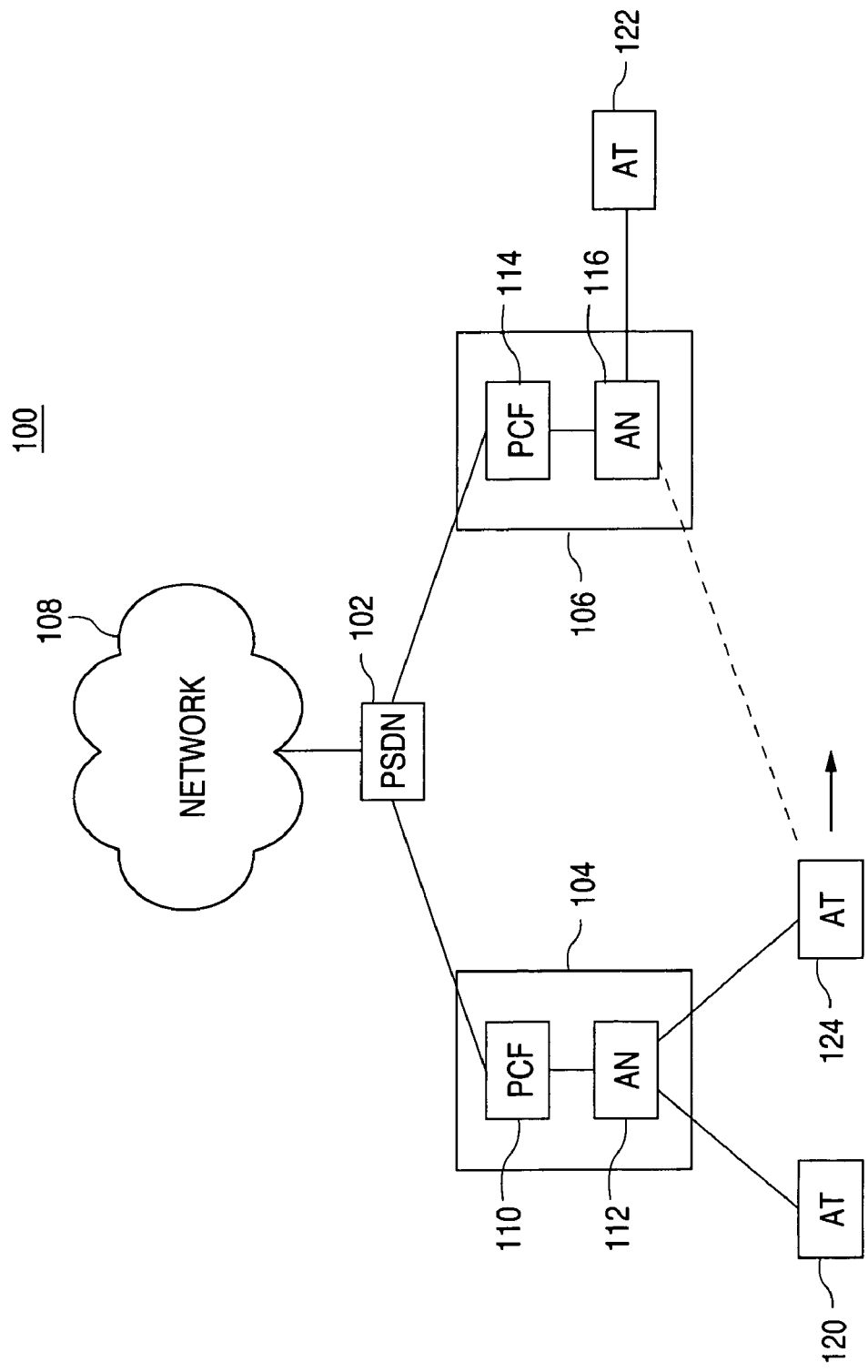
FIG. 2 depicts in block diagram form a wireless communications network in accordance with the present invention.

FIG. 2 illustrates an example communications network architecture or system 100 in accordance with the present invention. The system or network 100 shown in FIG. 1 is for illustration purposes only. Other embodiments of the system 100 may be used without departing from the scope of this disclosure.

In this example, the system 100 includes packet data serving node (PDSN) 102, radio access networks 104, 106 and a network 108. The radio access network 104 includes a packet control function (PCF) 110 and an access network (AN) 112, while radio access network 106 includes a packet control function (PCF) 114 and an access network (AN) 116. It will be understood that the radio access networks 104, 106 may be configured to include various devices or configurations. The PDSN 102 provides a gateway function between the radio access networks 104, 106 and the network 108.

The network 108 may include one or more local area networks ("LAN"), metropolitan area networks ("MAN"), wide area networks ("WAN"), all or portions of a global network, or any other communication system or systems at one or more locations, or combination of these, including the public switched telephone network (PSTN), Internet, packet networks and the like. In one specific embodiment, the network 108 is an Internet protocol (IP) network.

The AN 112 has coupled thereto a plurality of access terminals (AT) 120, 124, while the AN 116 has coupled thereto a AT 122. The ATs 120, 122, 124 are operable for communication wirelessly with the ANs 112, 116 over an air interface. Additional or fewer PDSNs, radio access networks, PCFs, ANs and ATs may be included in the system 100 which communicate with the ANs 112 over wireless interfaces, and different configurations of system 100 may be utilized in accordance with the present invention (such as different TIA embodiments).

The structure and functionality of the PDSN 102, radio access networks (sometimes referred to as RANs) 104, 106, access networks 112, 116 and PCFs 110, 114 are generally well-known. The PCFs 110, 114 may include components such as processing units and PCF network interfaces, while the ANs 112, 116 may include components such as controllers and access network transceiver systems (not shown). Such components may include, and are not limited to, microprocessors, microcontrollers, memory devices, and/or logic circuitry, and these may be adapted to implement various algorithms and/or protocols. No additional description of the conventional functionality and application of PDSN, RANs, ANs, and PCFs, other than as noted herein or relevant for an understanding of the present invention, is provided. As will be appreciated, an authorization, accounting and authentication (AAA) server or device (not shown in FIG. 2) may be included in system 100.

It will be understood that the PDSN 102, the radio access networks 104, 106, the PCFs 110, 114 and the ANs 112, 116 may be constructed or configured from any suitable hardware, software, firmware, or combination thereof for providing the functionality known to those of ordinary skill in the art. These devices will include additional functionality as described below in accordance with one or more embodiments of the present invention.

The network 108, PDSN 102, RANs 104, 106, ANs 112, 116 and PCFs 110, 114 are interconnected via communications lines which may be wired or wireless, or any combination thereof. The system 100 may utilize any suitable protocol or protocols, and in a specific embodiment, the wireless network portion of the system 100 functions in accordance with the HRPD protocol. The PDSN 102 and RANs 104, 106 (and/or portions thereof) may also be collectively referred as an "access network." In other embodiments, an AN and its associated PCF may be referred to as an "access network."

As will be appreciated, other components, devices or networks may be included in the system 100, and FIG. 1 only illustrates but one exemplary configuration to assist in describing the system and operation of the present invention to those skilled in the art. The system represented in FIG. 1 may be described using different nomenclature or system terminology, such as use of the terms mobile subscriber terminals (MS or MT) (an access terminal), base transceiver stations (BTS or BS) (an access network or node), base station controllers (BSC) and mobile switching centers (MSC), and the use of any given nomenclature to describe a device within the system 100 is not intended to limit the scope of this disclosure.

The access terminals or devices 120, 122, 124 represent devices utilized by users or subscribers during communication sessions over/within the system 100. For example, each of the communication devices may include an input/output device having a microphone and speaker to capture and play audio information. Optionally, each of the communication devices 120, 122, 124 may also include a camera and/or a display to capture/display video information. During a communication session, the ATs 120, 122, 124 communicate with other devices connected to the network 108 (or within the system 100). In this way, the ATs 120, 122, 124 may exchange audio, video, graphical, or other information during a communication session.

Each access terminal 120, 122, 124 may be constructed or configured from any suitable hardware, software, firmware, or combination thereof for transmitting or receiving information over a network. As an example, the ATs could represent telephones, videophones, computers, personal digital assistants, and the like, etc.

As shown, an AT 124 is positioned near both the source AN 112 and the target AN 116, whereby a communication session has been currently established with the source AN 112. The dotted line refers to an eventual communication session that will be established between the AT 124 and the target AN 116. As explained more fully below, the AT 124 will engage in a hard handoff from the source AN 112 to the target AN 116.

The general operation of a hard handoff in accordance with the present invention will now be described.

Figure 3:
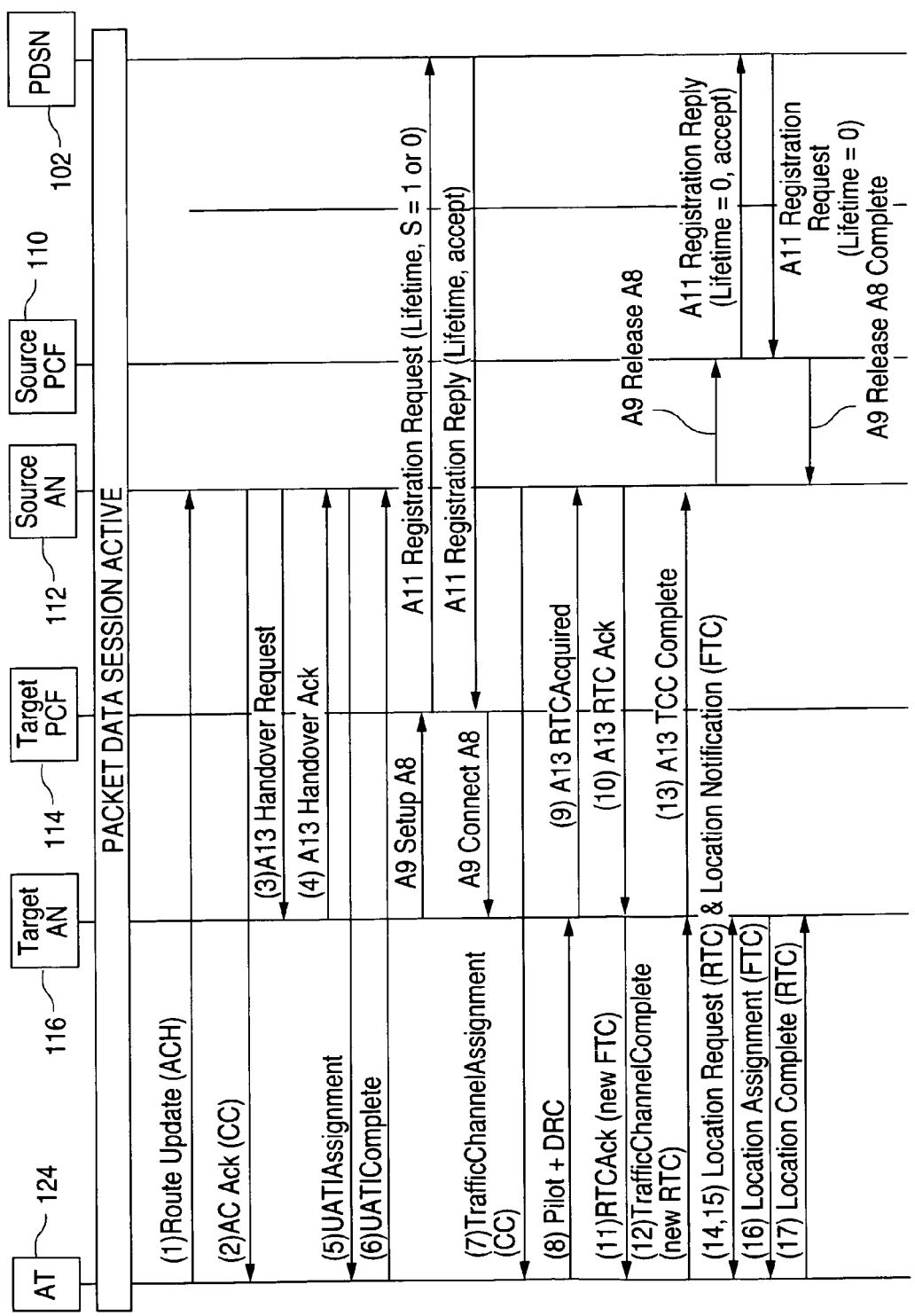
FIG. 3 depicts call or message flow or method for hard handoff in the wireless communications network in accordance with the present invention.

Now referring to FIG. 3, with continued reference to FIG. 2, the source RAN 104 is supporting an already active packet data session for AT 124 through the source AN 112. For the purpose of illustration, assume that AT 124 determines that it desires to utilize a different RAN (or AN), such as the target RAN 106.

The following is a detailed description of the signaling flow timeline shown in FIG. 3.

An active packet data session is supported by the AT 124, the source AN 112, the source PCF 110, and the PDSN 102 (a PPP connection exists between the AT 124 and PDSN 102). The AT 124 sends a Route Update message to the source AN 112, and the source AN 112 acknowledges. The source AN 112 and target AN 116 perform A13 messaging for handoff. This generally includes an A13 Handoff Request and an Acknowledgement. Additional A13 messaging is usually included such as a Session Information Request and a Response. These Session requests/responses typically transfer certain data between the source AN 112 and target AN 116, such as the AT's session information, target AN/cell information, the AN-ID of the source PCF 110, the address of the PDSN 102, the QoS contexts associated with AT's session (s), and may include the air interface version in use at the source so the target can format the air interface TCA message accordingly. If fast handoff is supported, it includes the anchor PDSN and Anchor P-P addresses.

UATI Assignment and related flows, messages and procedures occur between the AT 124, source AN 112, target AN 116, source PCF 110 and/or target PCF 114 (identified generally using the UATI Assignment and UATI Complete notations). Additional messaging may also be involved.

Prior to traffic channel assignment, the target AN 116 sends an A9-Setup-A8 message to the target PCF 114 to establish an A8 connection therebetween. The target PCF 114 sends an A11-Registration Request message to the PDSN 102. This message includes a non-zero lifetime value and an S-bit equal to 0 or 1, and may include other information. The PDSN 102 validates the A11-Registration Request and accepts the connection by returning an A11-Registration Reply message with an accept indication and the Lifetime field set to the configured value. The target PCF 114 responds by sending an A9-Connect-A8 message to the target AN 116. This procedure establishes an A10 connection between the PDSN 102 and target PCF 114 and an A8 connection between the target PCF 114 and the target AN 116.

In one embodiment of the present invention, the S-bit (or flag) referred to above is used to indicate or request (or invoke) unicasting or bicasting functionality of the PDSN 102. When the S-bit equals zero, the PDSN 102 operates in the normal or unicast mode—transmitting data packets of the session to a single PCF (the target PCF 114/target AN 116). When the S-bit equals one, the PDSN 102 operates in a bicast mode—transmitting data packets to two PCFs (the target PCF 114/target AN 116 and the source PCF 110/source AN 112). As such, the PDSN 102 of this embodiment of the present invention is configured or modified to utilize a bicast flag and includes bicasting functionality.

In other words, the PDSN 102 sends the same data packets to both the source and target RANs 104, 106 over the existing and established A10 connections. As a result, the target RAN 106 may buffer the received data packets until the new connection between the AT 124 and target AN 116 is established Meanwhile, the source RAN 104 is also receiving the data packets and operably transmits them to the AT 124 for as long as the connection between source AN 112 and AT 124 exists. This reduces the effects of the blackout period by effectively shrinking the blackout period, as the new target RP connection is initiated or established prior to traffic channel assignment. Therefore, according to one embodiment of the present invention, early establishment of the target RP connection (connection between the PDSN 102 and the target PCF 114) is performed.

It will be understood that the A10 connection procedure for the target RP connection may be triggered from any of the aforementioned events, and not necessarily resulting from the A8 connection setup. It will be further understood that should the AN function and the PCF function be combined into a single function; the invention may still be applied while eliminating the A8/A9 interfaces.

At some point in time, the source RP connection is disconnected. In order to gain some benefits from bicasting, it will be understood that the termination of the source RP connection should occur sometime after the establishment of the target RP connection.

The additional messaging, flows and procedures shown in FIG. 3 as occurring after early establishment of the target RP connection (PDSN 102 to target PCF 114) are conventional flows known to those of ordinary skill in the art. Therefore, no further detailed description is provided for these. It will be understood that the termination of the source RP connection (A8/A10 connections involving the source AN 112, source PCF 110 and PDSN 102) may occur at other times, than as shown in FIG. 3. Similarly, it will be understood by those skilled in the art that certain of the flows or steps illustrated in the process of FIG. 3 may also occur at times different than that shown. However, in one embodiment disclosed herein, the establishment of the target RP connection (A10 connection) occurs prior to the initiation of traffic channel assignment activities. Another embodiment envisions initiation, not necessarily establishment, of the target RP connection prior to traffic channel assignment activities.

In accordance with another aspect of the present invention, there is contemplated a tunneling method. This method may be utilized with or without the early target RP connection establishment method. With the early establishment method, tunneling will likely be utilized when the above-described bicasting functionality described herein is unavailable or unused (unicasting).

A tunnel, or connection, is established between the source AN 112 and the target AN 116 (or between the source and target PCFs 110, 114). Data packets from the PDSN 102 received at the source AN 112 are transmitted/forwarded through the tunnel to the target AN 116. The target AN 116 may buffer the received data packets until the new connection between the AT 124 and target AN 116 is established. Meanwhile, the source AN 112 may also be transmitting these same data packets to the AT 124 for as long as the connection between the source AN 112 and the AT 124 exists. Optionally, the source AN 112 may not transmit the data packets to the target AN 116 until its connection with the AT 124 is terminated.

Alternatively, data packets from the PDSN 102 and received at the target AN 116 (via the early RP connection) are transmitted/forwarded through the tunnel to the source AN 112. The source AN 112 then transmits these to the AT 124 via the current connection. Once this connection is terminated, the data packets will no longer be transmitted to the AT 124. In the event, the target AN 116 should be notified.

As described above, the tunnel between the source AN 112 and target AN 116 may provide flow of data packets in either direction, depending on which AN is receiving the packets from the PDSN 102 in the unicast.

This tunneling/forwarding method may also reduce the effects of the blackout period by effectively shrinking the blackout period. Therefore, according to this aspect, relaying received data packets from the source AN to the target AN is performed. Tunneling combined with early establishment of the target RP connection (connection between the PDSN 102 and the target PCF 114) may provide additional benefits.

The connection or path (tunnel) for carrying user data packets (such as VOIP packets or other user data) between the source AN 112 and target AN 116 may be accomplished in any suitable manner. Other communications paths or protocols may be used to establish and maintain the tunnel. In one embodiment, A16 or A13 signaling is used to establish the tunnel. In one embodiment, an IP to IP communications path is established for carrying the data packets, and in another embodiment the tunnel is a GRE tunnel. Should the AN function and PCF function be combined into a single function, the connection path (tunnel) will be set up between the source AN/PCF function and the target AN/PCF function.

In general terms, one embodiment of the present invention is directed to establishment or initiation of the target RP connection earlier than done in the prior art. In another embodiment, this method further includes bicasting data packets to both the source and target ANs. In yet another embodiment, a tunneling method is used with the early establishment method when bicasting is inoperable (unicasting occurs).

In one embodiment, the method and system of the present invention is used in accordance with the HRPD or CDMA2000 protocol or specification. In other embodiments, the foregoing concepts and embodiments may not be limited to HRPD, but may be useful in other communications protocols and systems, such as UMTS, LTE, WiMax, WiFi, and the like.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for facilitating handoff of an access terminal (AT) between a source access network (AN) and a target AN in a wireless communications network, the method comprising:

supporting an active packet data session between the AT and the source AN, the active_packet data session comprising an active, non-dormant traffic data transfer session;

receiving a message during the active packet data session from the AT operable for initiating handoff of the AT;

during the active data packet session and prior to traffic channel assignment, initiating establishment of a communications path between the target AN and a packet data node for carrying user data packets;

sending a setup request from the target AN to the packet data node requesting establishment of the communications path between the target AN and the packet data node;

receiving a setup reply at the target AN from the packet data node; and establishing the communications path between the target AN and the packet data node for carrying user data packets.

2. The method in accordance with claim 1 wherein the sending a setup request, the receiving a setup reply, and the establishing are performed prior to traffic channel assignment.

3. The method in accordance with claim 1 wherein the setup request comprises an A11 Registration Request, the setup reply comprises an A11 Registration Reply, and the communications path comprises an A10 connection, in accordance with High Rate Packet Data (HRPD).

4. The method in accordance with claim 3 wherein the packet data node is a Packet Data Serving Node (PDSN) in accordance with HRPD.

5. The method in accordance with claim 3 wherein the target AN comprises a target packet control function (PCF) and the communications path is established between the PCF and the packet data node.

6. The method in accordance with claim 1 further comprising establishing the communications path between the target AN and the packet data node for carrying user data packets.

7. The method in accordance with claim 6 further comprising bicasting data packets from the packet data node.

8. The method in accordance with claim 7 wherein the bicasting is performed in response to receiving bicasting information from the target AN.

9. The method in accordance with claim 8 further comprising:
   establishing the communications path in response to an A11 Registration Request output from the target AN;
   inserting bicasting information in the A11 Registration Request.

10. The method in accordance with claim 9 wherein the bicasting information is included within an S-bit field in the A11 Registration Request.

11. The method in accordance with claim 6 further comprising generating a tunnel between the source AN and the target AN operable for carrying user data packets unicast from the packet data node.

12. A source access network (AN) in a wireless communications system, the source AN comprising:
   means for supporting an active packet data session between an access terminal (AT) and the source AN, the active packet data session comprising an active, non-dormant traffic data transfer session;
   means for receiving, during the active data packet session, a message from the access terminal (AT), the message operable for initiating handoff of the AT from the source AN to a target AN;
   means for, during the active data packet session and prior to traffic channel assignment, initiating establishment of a communications path between the target AN and a packet data node for carrying user data packets;
   means for sending a setup request from the target AN to the packet data node requesting establishment of the communications path between the target AN and the packet data node; and
   means for receiving a setup reply at the target AN from the packet data node.

13. The source AN in accordance with claim 12 wherein the setup request comprises an A11 Registration Request, and the A11 Registration Request includes a bicasting flag.

14. A computer program embodied on a non-transitory computer readable medium and operable to be executed by a processor within a communications device, the computer program comprising computer readable program code for:
   supporting an active packet data session between an access terminal (AT) and a source access network (AN), the active packet data session comprising an active, non-dormant traffic data transfer session;
   receiving a message during the active data packet session from the access terminal (AT) operable for initiating handoff of the AT from a source AN to a target AN in a wireless communications network;
   during the active data packet session and prior to traffic channel assignment, initiating establishment of a communications path between the target AN and a packet data node for carrying user data packets;
   sending a setup request from the target AN to the packet data node requesting establishment of the communications path between the target AN and the packet data node; and
   receiving a setup reply at the target AN from the packet data node.

15. The computer program in accordance with claim 14 wherein the setup request comprises an A11 Registration Request, and the A11 Registration Request includes information indicating bicasting.

\* \* \* \* \*